W. W. HUBBELL.
Amalgamator.
No. 69,672.
Patented Oct. 8, 1867.
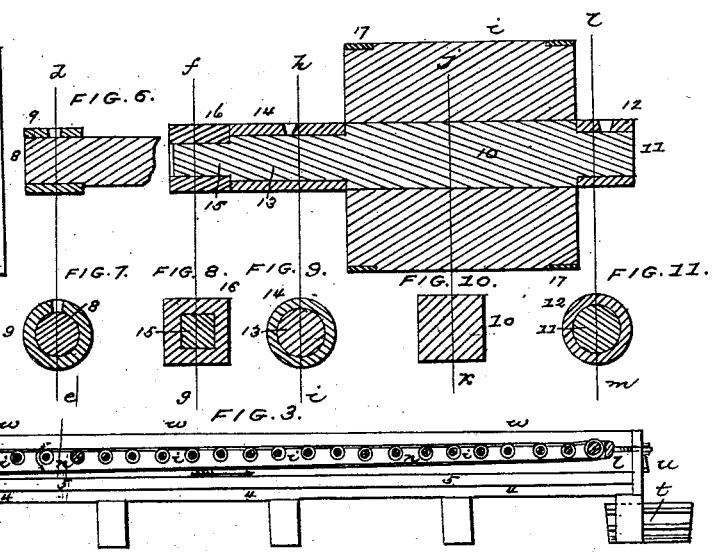
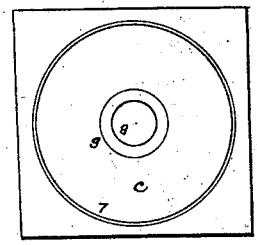
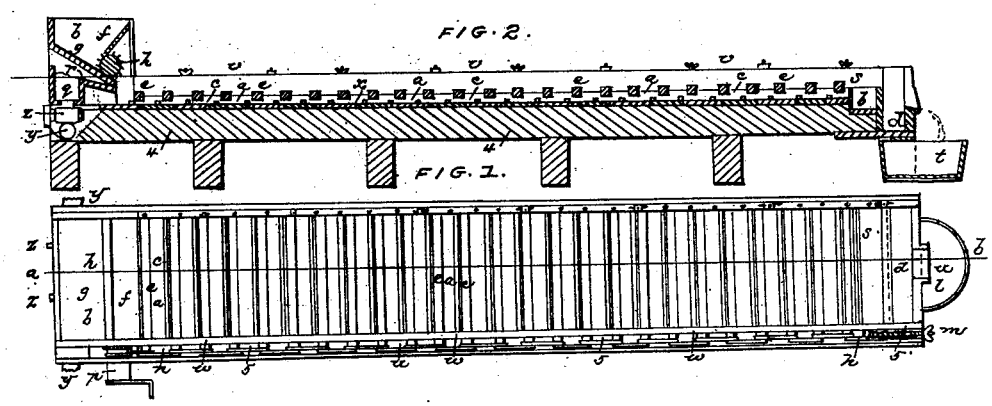
WITNESSES.
INVENTOR.

United States Patent Office.

WILLIAM WHEELER HUBBELL, OF PHILADELPHIA, PENNSYLVANIA.

*Letters Patent No. 69,672, dated October 8, 1867.*

---

IMPROVEMENT IN AMALGAMATORS.

---

*The Schedule referred to in these Letters Patent and making part of the same.*

---

TO ALL WHOM IT MAY CONCERN:

Be it known that I, WILLIAM WHEELER HUBBELL, of the city of Philadelphia, and State of Pennsylvania, have invented a new and useful Improvement in Apparatus to Amalgamate Gold and Silver with Quicksilver, and extract the former from their ores when pulverized; and I hereby declare the following to be a full, clear, and exact description thereof, reference being had to the annexed drawing, making part hereof, in which like letters of reference indicate similar parts.

Figure 1 is a ground plan of the entire amalgamator.

Figure 2 is a longitudinal section through the middle of fig. 1, on the line *a b*.

Figure 3 is a side view, with the side piece 3 removed from its bottom piece 5, showing the construction and arrangement of the revolving pulleys and wheels, to rotate the feed-wheel *h* and amalgamating-bars *e*.

Figure 4 is a full-size end view of one of the revolving amalgamating-bars, its journal and bush, which set in the side piece *x*, under the movable piece *v*.

Figure 5 is a section through the axis of one of the pulleys, of full size, which revolve the bars *e*, showing its shaft and journals 11 and 13 in their bushes, and the square end 15 of the shaft in the bush 16, adapted to set in the end of the bar *e*, whereby to revolve it.

Figure 6 is a section through the axis of the journal and bush of fig. 4, which is on the end of the bar remotest from the pulley end.

Figure 7 is a section through fig. 6, on the line *d e*.

Figure 8 is a cross-section on the line *f g*, through the square bush and end of the shaft of the pulley-wheel, to revolve the bar *e*.

Figure 9 is a cross-section through the journal of this shaft, on the line *h i*.

Figure 10 is a section through the square part of this pulley-shaft, on the line *j k*, by which the body *i* of the pulley revolves the shaft.

Figure 11 is a section through the outer journal-end and bush of the pulley-shaft, on the line *l m*.

The figures 1, 2, 3 are on a scale of about half an inch to the foot. The figures 4, 5, 6, 7, 8, 9, 10, 11 are of full size.

The nature of my invention consists in the construction and arrangement of the parts and operation of the amalgamator, hereinafter described, whereby—

First. It is made to force the ore, when pulverized and saturated freely with water, repeatedly downward and longitudinally into and along a series of cells, or a bed of quicksilver, by means of angular-faced revolving bars, suspended horizontally in a series crosswise over a long bed or platform, containing the cells or body of quicksilver, which readily thereby amalgamates with and retains the gold and silver.

Second. In constructing and arranging a feed-wheel and water-way to operate together, and, with the said angular-faced bars, to regularly supply them with the saturated ore for amalgamation in the before-mentioned manner.

Third. In constructing and applying, in connection with and behind the bars and amalgamating bed or cells, a waste-basin and amalgam-reservoir, *b d*, adapted to receive and save the quicksilver, gold, and silver, or amalgam, as it is sometimes driven back in and with the ore, by the action of the bars before settling.

Fourth. In constructing the side pieces, the bars, and their revolving appliances, so that the former may be readily removed, to collect the amalgam, and be again restored to their place and work without disturbing the revolving appliances.

Fifth. In the construction, arrangement, and gearing of the revolving pulleys, to revolve all the bars together and with the feed-wheel.

The letters *a* denote the bed or cells of the apparatus. The platform of the bed consists of plank, extending crosswise, faced on top with sheet copper or iron, and the sides *w v* also faced with copper or iron, all tight as high up as the journals of the cross-bars *e*, passing through them, and the copper or iron is extended up to the tops of the sides. This bed of plank rests on three beams 4, one in the middle and one each side, extending the whole length of the bed, and supported on legs, shown in figs. 2 and 3. This metallic-faced bed extends horizontally, is from thirty to fifty feet long, and three to four feet wide. If the gold is free, thirty feet is long enough; if it is mixed with sulphur or rebellious metals it should be longer, and may be lengthened or shortened, as desired. When the bed has been faced with the copper or iron, I form the cells $a$ along it by tightening down on to it pieces of hard wood, half to three-quarters of an inch thick, and three-quarters of an inch wide, by screws, so that they shall form a series of bars or cells, extending across the bed, $c$ denoting these bars, and $a$ the copper-faced cells between them. They extend from the feeding-wheel $h$ and water-flume $r$ to the settling-reservoir $b$, as shown in figs. 1, 2.

I construct square or angular-faced bars $e$, of the size shown in fig. 4, or thereabouts, and long enough to extend across the bed, and revolve between the sides $w$ and $v'$, and place one of these revolving bars $e$ behind each cross-bar $c$ or cell $a$, as shown in figs. 1 and 2, so as to revolve with their corners clear of the quicksilver about a quarter of an inch, leaving thereby a changing degree of space between the quicksilver and the revolving bars, that they may force the saturated ore down and under themselves along the bed or cells of quicksilver. The saturated ore is kept about as deep or high up as to the axis of the revolving bars, which also have a leather washer at each end, to keep it out of the journal-bearings. These bars $e$ being square-faced, tend to gently press the saturated ore down, and back into and along the quicksilver, and not throw the ore violently upward by back-lash. They produce a perfect amalgamation of the gold and silver with the quicksilver, by continually forcing down the scales and light particles of gold, which ordinarily tend to float off on the water and are lost.

This construction and operation is continuous from the feeder to the cross-bar $s$ at the end of the series of revolving bars. This bar $s$ is shown in figs. 1, 2, extending up as high as the axis or centre of the revolving bars $e$, and its height in part regulates the depth of the saturated ore. At this bar $s$ the waste flows over it into the settling-basin $b$, to be presently described.

The feed-wheel $h$ and water-flume $r$ are constructed each of a length equal to the length of the revolving bars $e$ or cells $a$, so as to supply the ore, saturated with water, uniformly across the apparatus. The feed-wheel $h$ supplies the ore dry, and having been finely pulverized by Hubbell & Patton's mill, or other process, and also desulphurized by Hubbell's or other process, if it needed it. And the water-flume $r$ is placed directly under the chute $g$ of the feed-wheel, so that the dry, pulverized ore and water come together immediately in front of the first revolving bar, where the saturation takes place, and the amalgamation begins with the action of this first bar $e$. (See fig. 2.) The feed-wheel $h$ has a series of longitudinal ribs secured to its wooden body, to catch and carry down and feed the ore regularly, the ore being first thrown into the receptacle 6, having inclined bottom pieces $g f$, which direct it to the fron of the feed-wheel, and the incline $f$ keeps it away from the rear face of the wheel. The water is supplied by a pipe, $y$, extending horizontally under the bottom of the basin $q$, and having faucets $z$ from it to the bottom of the basin $q$, in which the water rises and flows uniformly over the entire width of the flume $r$. This faucet $z$ enables the supply to be regulated so as not to flood the revolving bars too high, nor give too little water. The saturation of the ore must be sufficient to enable it to flow or move in a body under the action of the revolving bars. This revolving feed-wheel $h$ takes its motion from a cog-wheel, 1, on its shaft, figs. 1 and 3, which gears into a smaller pinion on the shaft of the pulley-wheels $o$ and $p$, the former of which, $o$, operates all the pulley-wheels $i$ of the revolving bars $e$, by means of its cord $n$, wound and arranged as shown in figs. 1, 3, and the pulley $o$ receives the power from the main pulley or crank $p$. The main pulley is for use with a power-wheel, the crank is for use by hand-power. The arrangement of all the pulleys will be presently described.

Immediately behind the rear bar $s$ is constructed a deep basin, $b$, equal in length to the width of the bar and bed. (See figs. 1, 2.) This basin is all faced tight with sheet copper or with iron, and the waste, saturated ore, containing some particles of quicksilver and gold and silver mixed, passes over the bar $s$ into it, and there, being freed from the agitation of the rollers, the amalgam they caused settles down in the bottom of the basin, while the lighter particles and water flow over the rear side of the basin $b$, and fall into the basin $d$. This latter basin has a lower chute, $u$. The fall of water here loosens and washes the particles, so that any metal passing with it will settle in its bottom, which is also faced with copper or iron. The waste, saturated ore falls from the chute $u$ into the vat $t$, where the ore may settle and the water be drawn off, and any metal held in suspension in it, such as silver or copper, may be precipitated, the former by copper plates suspended in it, and the latter, afterwards, by iron suspended in it, as is well known in precipitating those metals when they have been previously treated, so as to be held in suspension, so that nothing is lost by this process or apparatus.

I will now describe the construction to apply and remove the revolving bars $e$. These bars $e$ are made of close-grained wood, about four inches square, fig. 4 showing the full size. They are saturated with linseed oil, then with shellac varnish when dry. In each end is set a ring or band, 7, to prevent splitting. The end shown in this fig. 4 has a round journal-bearing, 8, which turns in an annular bush, 9, having an oil-hole in the top. Figs. 6 and 7 are sections of the same. The shaft 8 is about six inches long, square pointed at the end, and set tight into the wood. This forms the entire structure of this end of the revolving bar, which is located at the side $v$ most remote from the pulleys $i$. These bars $e$ extend, as shown in fig. 1, across to the side $w$. This end of the bar is provided with a square bush, 16, figs. 5, 8, which fits over a square end, 15, of the shaft 10 of the pulley $i$, figs. 1, 3, 5. All the bars $e$, and all the pulleys $i$, and their shafts and fixtures, are alike, so that any bar fits on to and operates with any pulley. The shaft 10 of the pulley has a round journal-bearing, 13, which fits and runs in a bush, 14, having an oil-hole in its top, which bush is driven in and extends through the side piece $w$, figs. 1, 3, which forms a side to the bed, and is located between the bars $e$ and their pulleys $i$, and by this construction and arrangement the saturated ore and amalgam are kept away and prevented from clogging the revolving apparatus. At the same time the side piece $v$ of the bed is set inside of the side piece $x$, down on a shoulder running its whole length, figs. 1, 2, in which the bushes 9, clasping the journal 8, are dropped in a half-round cut, and the opposite half-round cut being in the side piece $v$, which is secured down by thumb-screws, shown in figs. 1, 2. The opposite end 16 of the bar having been slipped over the square end 15, and the bush 9, and its journal 8, dropped in place, and secured down by the side piece $v$ and its thumb-screws, fastens the revolving bars in place for operation, and by removing the side $v$ they can be lifted out, to make clear space for cleaning the amalgam out from the cells $a$ or bed of the apparatus.

Each of these revolving bars $e$ has its own pulley $i$, concentric with it. These pulleys are in a series between the side piece $w$ of the bed and their own side piece 3, which is made to carry their bushes 12, in which their journals 11 run. At the back end of this series of pulleys is a pulley, $k$, which runs between checks $l$ of an iron tightening-screw, 5. This screw runs through the end piece of the frame, figs. 1, 3, and tightens up by the thumb-screw $m$. By drawing up this pulley $k$ by this screw it tightens up a pulley-cord, $n$, which is shown in figs. 1, 3, and presently will be described.

At the front end of the series of pulleys $i$ is a main pulley-wheel, $o$, figs. 1, 3, geared on the square shaft of the power-pulley and crank $p$, which pulley $o$ actuates all the other pulleys $i$ which rotate the bars $e$. Below the pulley $o$ is a guide-wheel, 2, which directs the cord $n$ down so as to clear the pulleys $i$, as it passes back to and around the return-pulley $k$. The arrows, fig. 3, indicate the directions of motion of the cord $n$, feed-wheel 1, and pulley $o$ and pulleys $i$, with their revolving bars $e$. This cord $n$ is endless, makes one turn around the pulley $o$, then passes under the wheel 2, clear of everything, and makes a half turn on the pulley $k$; then it makes a full turn around the first pulley $i$, then a full turn around the second pulley $i$, and takes the same full turn around every pulley $i$, as shown in figs. 1 and 3, revolving them all in the same direction; and it comes back to the pulley $o$, which continually draws it over the pulleys $i$ towards itself, as the source of power in this apparatus. By this simple construction, arrangement, and operation, the bars $e$ are rotated altogether, and can be removed and replaced without disturbing the rotating apparatus; and it is protected from the ore and amalgam inside of the bed. An oil-hole is shown over each journal, and a leather washer inside, as before said, keeps out the ore from the journals.

The pinion on the shaft of the pulley $o$, shown inside, in fig. 3, as running into the pinion 1 of the feed-wheel, gives the proper direction of motion to the feed-wheel, as indicated by its arrows, in figs. 2, 3, to feed in the dry, pulverized ore to the water, shown at $r$ in fig. 2, while, at the same time, the construction and arrangement of the pulleys and their cord, all taking their power from the same shaft of the pulleys $o$ and $p$, give them the proper direction of rotation and velocity, in relation to the feed-wheel; and these pulleys $i$ all have the same strain on them, which would not be the case with cog gearing on their shafts and between them. The feed-wheel $h$, moving slower than the amalgamating-bars $e$, prevents the feed from choking them with ore.

In fig. 5, 17 indicates bands on the ends of the pulleys $i$, to prevent splitting. The ribs $c$ may be made of copper or iron, narrower than the wood, and set up with a bottom flange, to fasten them down. The angular faces of the bars $e$ may be changed to more or less in number, or to small ribs or teeth; and these bars may be hollow, of copper or iron, instead of wood. The copper facing may extend up on the sides $v$, and to above the axis of the bars; and cog-wheels may be placed between the pulley-shafts, running in pinions on them instead of the pulleys $i$ and cord $n$, and with a cog-wheel in place of the pulley $o$, operating direct on the first shaft $i$; but these do not change the main principle of construction, arrangement, and operation of the apparatus; and I describe these various modes as directed by law. That which I have shown in the drawings, and described, is the simplest, cheapest, easiest made and kept in order in a mining country, and practically is the best. A board covering, in pieces, is laid crosswise over the sides $x$ $v$ $w$ 3 when the apparatus is in operation, which should be raised in part occasionally to see that the ore is properly saturated and flowing under the bars $e$.

What I claim, and desire to secure by Letters Patent, is—

1. The series of revolving angular-faced bars $e$, operating as described, over the cells $a$, or bed of quicksilver, upon the saturated ore, to force it down and longitudinally, successively, into contact with the quicksilver, for the purpose of enabling it to take up the gold and silver in the ore, and form an amalgam, thereby extracting these metals from their ores.

2. The construction and arrangement of the feed-wheel $h$ and water-way $r$, to operate together and with the said angular-faced revolving bars, to regularly supply them with and saturate the ore, for amalgamation, in the before-mentioned manner.

3. The construction and application, in connection with and behind the bars $e$ and amalgamating-bed $a$, of a waste-basin or basins, or amalgam-reservoir $b$ $d$, adapted to receive and save the quicksilver, gold, and silver, or amalgam, as it is sometimes driven back in and with the ore by the action of the bars, before settling, as described.

4. The construction, arrangement, and gearing of the revolving pulleys or their equivalents, to revolve all the bars together, by connections or shafts extending through the side piece $w$, and with the feed-wheel, substantially as described.

5. The construction of the side pieces $v$ and $w$, with the ends of the bars and their revolving appliances, so that the bars may be readily removed to collect the amalgam, and be again restored to their place and work without disturbing the revolving appliances, substantially in the manner and for this especial purpose, as described.

In testimony whereof I have hereunto set my hand.

WM. WHEELER HUBBELL.

Witnesses:
   JOSEPH ENGARD,
   FRANK W. ENGARD.